(No Model.)
R. KRIX.
WATER FILTERING APPARATUS, PROTECTOR AGAINST TUBE BREAKING, AND SELF ACTIVE CLOSING APPARATUS.
No. 523,815.  Patented July 31, 1894.
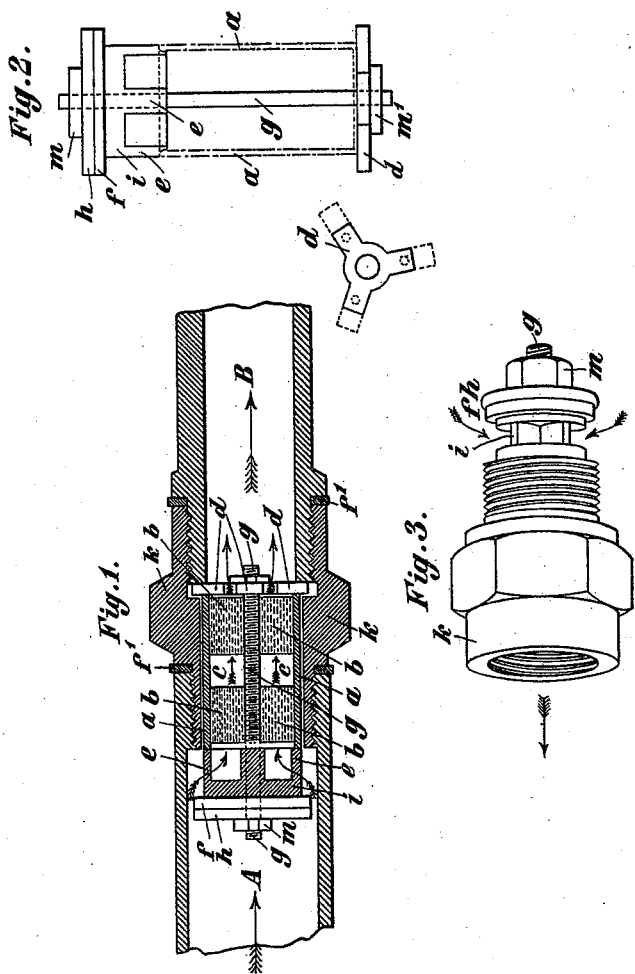
Witnesses:
Jesse Kingsbury
James E. Waugh
Inventor:
Richard Krix
By Whitaker & Prevost, Attys.

UNITED STATES PATENT OFFICE.

RICHARD KRIX, OF DRESDEN, GERMANY.

WATER-FILTERING APPARATUS, PROTECTOR AGAINST TUBE-BREAKING, AND SELF-ACTIVE CLOSING APPARATUS.

SPECIFICATION forming part of Letters Patent No. 523,815, dated July 31, 1894.

Application filed October 26, 1893. Serial No. 489,226. (No model.)

*To all whom it may concern:*

Be it known that I, RICHARD KRIX, of Dresden, in the Kingdom of Saxony and German Empire, have invented a new and useful Water-Filtering Apparatus, Protector Against Tube-Breaking, and Self-Active Closing Apparatus, of which the following is a specification, reference being had therein to the accompanying drawings.

This invention relates to the method of and to apparatus for filtering fluids under pressure and is especially designed for the purification of water so as to render it fit for domestic and manufacturing purposes. By its use organic matter and organisms contained in the water are removed or altered so that their prejudicial effect is destroyed while no unpleasant or prejudicial effect is produced.

The filtration and purification of water are effected according to these improvements in the following manner:—The water is forced under pressure through a chamber in which there are arranged at suitable distances apart above or behind each other, layers of capillary vegetable stems such as reed or cane, forming a filter. These capillary vegetable stems are subjected to a preliminary treatment. Thus, young unripe reeds or canes, such as the East Indian or *Arundo donax* are, before they are fully developed, cut off as near as possible to their roots and divided into pieces of from twenty to thirty centimeters in length. These pieces are placed for a period of two or three months, according to their quality, in a marshy soil and are allowed to remain there until new and substantial fibers are formed in the tubular network of the cane or reed, nearly closing it. The pieces are then removed and boiled slowly in a solution containing about ten per cent. of common salt which frees them from all noxious and slimy matters. They are then slowly dried for from ten to fourteen days and placed in a solution containing from twenty to twenty-five per cent. of permanganate of potash which is eagerly absorbed by the tubular structure of the cane or reed, which it fully penetrates. This treatment has the effect of constricting the capillary passages to such an extent that water can be forced through them only by pressure, when it exudes from the opposite end in minute jets. The permanganate of potash is in no way detrimental and does not affect the smell, taste or color of the water.

The canes, or reeds, prepared as hereinbefore described may be variously employed for the purposes of filtration and purification of water; but I prefer to arrange them above or behind each other in layers, and so that the spaces between the layers form chambers communicating with each other and with the outside through the capillary passages. This arrangement is made within a pipe or tube through which the water has to pass, so that the water must flow through the layers and be freed thereby from its impurities.

The accompanying drawings illustrate a form of apparatus which I may employ for the purposes of my invention.

In each of the figures of the drawings similar parts are denoted by similar letters of reference.

Figure 1 is a longitudinal section of the complete apparatus included in the pipes of a high pressure water service. Fig. 2 is a plan of the valve and holder. Fig. 3 is an elevation of the apparatus.

In the construction illustrated there are two layers $b\ b$ Fig. 1, each layer consisting of a closely packed bundle of the prepared pieces of capillary vegetable stems arranged around the spindle $g$ in such a manner that that they cannot lock together and that the chamber or space $c$ is preserved between them. On one end of the spindle $g$ there is a valve $i$ with wing guides $e$, firmly fixed, which consists of the india rubber or leather disk $f$ and a similar metallic disk $h$ outside it. These disks $f\ h$ are secured upon the spindle $g$ by the nut $m$. The layers of fiber $b\ b$ are pressed into a cylinder $a$ which may form a continuation of the guides $e$ and which is inserted into the coupling piece $k$. At the opposite end of the cylinder $a$ there is secured the cross piece $d$, by the nut $m'$. In the drawings, this cross piece is shown to the left of Fig. 2, and as it is of greater diameter than the cylinder $a$ and fits into a recess in the coupling $k$, it serves when the delivery pipe B is in place, to prevent any alteration in the relative positions of the cylinder and coupling.

Apart from the delivery pipe B the cylinder $a$ can slide in the coupling $k$ to the extent of the difference between the distance from $f$ to $d$ and the length of that part of the coupling $k$ which forms the seating for the cylinder. When the packet cylinder, valve and end piece $d$ are inserted into the coupling and the pipe B is screwed home, the apparatus is firmly fixed as shown by Fig. 1. The water then enters from the supply pipe A through the openings between the wings $e$ and passes through the layers $b\,b$ where it becomes purified, and escapes through $d$ to the delivery pipe B. If the delivery pipe is disconnected the pressure of the water in A, exerted upon the disk $h$, forces the cylinder through the coupling $k$, pressing the soft part $o$ of the valve upon the end of the coupling which forms a seat for it, and thus stops the further flow of the water.

The water travels at so slow a rate through the apparatus that, in the event of the sudden closing of a tap, no concussion or hammer will take place in the supply pipes and their bursting from this cause will be prevented. Also since the water must pass through the layers $b\,b$ before it can enter the delivery pipe B, there can be no concussion from the same cause in that pipe.

It will be seen that if the delivery pipe B is unscrewed and removed the force of the water will close the valve $f$ as before stated, and by unscrewing the nut $m'$ on the rod $g$ and removing the cross piece $d$, the casing can be removed, the filtering material renewed and the casing replaced without allowing any water to escape from the supply pipe A, during the operation.

What I claim, and desire to secure by Letters Patent of the United States, is—

1. In a filtering apparatus the combination with a water supply pipe, of a casing provided with filtering material adapted to be secured within said pipe, said casing having apertures to admit the passage of water through said filtering material and a valve movable under the pressure of the water to prevent the passage of water through said supply pipe and apertures, substantially as described.

2. In a filtering apparatus the combination with the water supply pipe, of a removable casing for filtering material adapted to be secured within said pipe and a valve operated by the pressure of the water to close said pipe to permit the removal of said casing, substantially as described.

3. In a filtering apparatus the combination with the water supply pipe of the longitudinally removable casing for filtering material provided with apertures to admit the water to said filtering material, and a valve operated by the pressure of the water for preventing the passage of water through said pipe and apertures, said casing being removably connected with said valve, whereby said casing may be removed when the valve is closed without allowing the water to escape, substantially as described.

4. In a filtering apparatus the combination with a water supply pipe, of a casing provided with filtering material, movably located in said pipe, having a valve for closing said pipe and apertures to permit the passage of water through said filtering material when the valve is open, said casing having a part operated upon by the pressure of the water to close said valve, whereby a longitudinal movement of said casing opens said valve and admits the water to the filtering material, substantially as described.

5. In a filtering apparatus the combination with the water supply pipe provided with a recess to receive a delivery pipe, a longitudinally movable casing in said supply pipe provided with filtering material and having apertures to admit the water to said filtering material and a valve for closing said supply pipe, the pressure of the water closing said valve and apertures, said casing having a part projecting into the recess for the reception of the delivery pipe, whereby the insertion of the delivery pipe will move said casing longitudinally and open said valve and apertures, substantially as described.

6. The process of preparing cane reed and similar vegetable stems for filtering and purifying water, which consists in a preliminary deposit of the unripe stems in marshy soil, a subsequent boiling in salt solution, drying, and a final immersion in solution of permanganate of potash, substantially as hereinbefore described.

7. An apparatus for use in filtering and purifying liquids, consisting of a coupling $k$, a cylinder $a$, a cross piece $d$ inlets to the cylinder between the wings $e$, a valve $f\,h$, a screwed spindle $g$ with its nuts $m\,m'$, and a layer or layers of prepared vegetable stems in the cylinder, substantially as hereinbefore described and as illustrated by the accompanying drawings.

8. In a filtering apparatus the combination with a pipe coupling, of a filtering device removably located therein and a valve for closing the filtering device against the passage of water therethrough, substantially as described.

9. The combination with a water supply pipe, of a casing provided with filtering material adapted to be secured within said pipe, a valve for preventing the passage of water through said casing and pipe, said valve having connections extending into the recess for the reception of a delivery pipe, whereby the attachment of said delivery pipe opens said valve and its removal permits the pressure of the water to close the same, substantially as described.

10. The combination with a pipe coupling adapted to be secured to a water supply pipe, of a casing adapted to be secured within said coupling and a valve for closing against the end of the coupling to prevent the passage of water into the same, the said valve and casing being detachably connected whereby the valve will prevent the passage of water and permit the removal and replacement of the casing, substantially as described.

11. In a filtering apparatus the combination with a pipe coupling provided with a removable filtering device, of a valve operated by the pressure of water for preventing the passage of water through said filtering material, said valve having a part in position to engage a connecting pipe for opening said valve when said connecting pipe is inserted in the coupling whereby the connecting pipe can be detached to permit the removal and replacement of the filtering device, substantially as described.

In witness whereof I have hereunto set my hand in presence of two witnesses.

RICHARD KRIX.

Witnesses:
   JH. WALDAPFEL,
   ADOLPH FISCHER.